United States Patent [19]

Warshawsky

[11] 4,220,726

[45] Sep. 2, 1980

[54] IMPREGNATED RESINS FOR EXTRACTION OF METALS AND PROCESSES OF PRODUCTION AND USE THEREOF

[75] Inventor: Abraham Warshawsky, Rehovot, Israel

[73] Assignee: Yeda Research & Development Co. Ltd., Rehovot, Israel

[21] Appl. No.: 817,807

[22] Filed: Jul. 21, 1977

[30] Foreign Application Priority Data

Jul. 25, 1976 [IL] Israel ......................................... 50120

[51] Int. Cl.$^2$ .......................... B01D 15/08; B01J 8/06; C08J 9/40
[52] U.S. Cl. ................................. 521/55; 75/101 BE; 210/679; 252/426; 252/431 R; 252/431 N; 260/349; 260/566 AE; 260/950; 568/619
[58] Field of Search ...................... 260/2.2 R; 521/55; 252/426

[56] References Cited

U.S. PATENT DOCUMENTS

| 3,146,213 | 8/1964 | Small | 260/2.2 R |
| 3,960,762 | 6/1976 | Kroebel et al. | 252/426 |

OTHER PUBLICATIONS

Warshawsky, A., and Patchornik, A., "Recent Developments in Metal Extraction by Solvent Impregnated Resins," in The Theory and Practice of Ion Exchange, 1976, (ed M. Streat), London SCI, 38.

Resin Impregnates: The Current Position, Chem. and Ind., pp. 641–646 (Aug. 6, 1977).

*Primary Examiner*—Stanford M. Levin
*Attorney, Agent, or Firm*—Browdy and Neimark

[57] ABSTRACT

Extraction agents for the extraction of copper, zinc, uranium and nickel, or any of these, from aqueous solutions containing same, comprise a macroporous polymer supporting a specific extractant for such metal, the polymer being rendered hydrophilic by the method of impregnation or by attachment thereon of suitable functional groups, or by attaching such functional groups to the extraction agent, or by coabsorbing on said polymer an agent adapted to render the polymer hydrophilic. Such extraction agents may be produced by impregnating a macroporous polystyrene with a specific metal extraction agent in the presence of a diluent for the extraction agent, removing external diluent, contacting the product with a solution of the metal to be extracted, and removing the metal from the extraction agent by a suitable eluting agent. Alternatively, a macroporous polymer may be impregnated with a selective extraction agent complexed with the metal to be extracted in the presence of a diluent, the external diluent removed and the metal eluted with a suitable eluent. Furthermore, macroporous polymers containing finely dispersed metal powders may be prepared, which polymers can be used as catalyst in organic synthesis.

17 Claims, No Drawings

IMPREGNATED RESINS FOR EXTRACTION OF METALS AND PROCESSES OF PRODUCTION AND USE THEREOF

FIELD OF THE INVENTION

The present invention relates to novel selective extraction agents for certain metals.

The novel extraction agents according to the present invention are resins impregnated with selected chemicals, which impart to such resins the desired properties.

BACKGROUND OF THE INVENTION

There are known various types of resins which have certain specific functional groups and which are extraction agents for the extraction of certain metals from solutions by hydrometallurgical processes. Such resins are rather difficult to manufacture and they are quite expensive. It has been suggested to impregnate suitable polymers by means of extraction agents held by physical forces to said polymers. In U.S. Pat. No. 3,146,213 a microporous resin is described whereon there is absorbed a reagent, and which is suited for the selective recovery of uranium. The resin had to be modified by the introduction of sulfonic groups, which rendered it hydrophilic. The introduction of such groups reduces the selectivity of the resin.

An improved impregnated polymer was described in Trans. Instn. Min. Metall. 1974, 83, C-101 which describes the preparation of the resin by adsorption of the reagent from a solution thereof and slow removal of the solvent under reduced pressure.

Another method is based on the addition of reagents to monomers such as styrene and divinylbenzene, and encapsulation of the reagent during polymerization, DT 2162951, 18.12.71.

The above approaches did not give satisfactory results, and this seems to be due to the fact the full capacity of the extraction agents cannot be utilized. While 2-diethyl hexylphosphoric acid (EHPA) is an efficient extraction agent, when same is absorbed on XAD-2 by the dry method, where all the solvent is removed by slow evaporation under vacuum, the efficiency is reduced to about 1/10th. Amongst the reasons for this there seem to be insufficient hydration, a partial collapse of the macroporous structure leading to hydration problems, insufficient flexibility of the immobilized reagent, or a combination of these. According to the present invention the above problems are overcome to a large extent and reagents having a better selectivity and efficiency are prepared.

SUMMARY OF THE INVENTION

According to the present invention there are provided improved impregnated resins adapted for the selective extraction of predetermined metals from solutions. There is provided a novel process of impregnating known resins of the macroporous polystyrene type; there are provided novel resins which serve as supports for various extraction agents; there are provided novel extraction agents which are advantageously used for the impregnation of resins and there are provided novel reagents which are attached to resins by strong physical bonds. There is provided a process for the selective extraction of predetermined metals, using novel impregnated resins of the present invention, and especially to the extraction of copper, zinc, uranium and nickel.

The novel impregnation technique of the present invention comprises impregnating a suitable resin, such as macroporous polystyrene of the Amberlite XAD series (Rohm and Haas. Co.) or the like, with a selective extraction agent dissolved in a solvent readily adsorbed by the polymer, which has a low boiling point. Only a slight excess of the solvent over the adsorption capacity of the resin is used; the resin is impregnated and left for a suitable period of time (some 16–24 hours) during which time the solvent which is not adsorbed is evaporated. A solution of the desired metal is prepared and the polymer is reacted with same; the metal is eluted and after this the resin is again ready for use.

Suitable solvents are methylene chloride, benzene, pentane, hexane, carbon disulfide, chloroform, carbon tetrachloride, dichloroethane and the like. The solvent of choice for macroporous polystyrene resins is methylene chloride.

According to a further embodiment of the invention there are provided hydrophilic extraction agents which are used to impregnate suitable resins. Novel hydrophilic extractants according to the present invention comprise the ligand moiety, and attached thereto terminally blocked polyoxyalkylene units, such as polyoxyethylene or polyoxypropylene which impart the required hydrophilicity to the reagent.

The following Table illustrates some of the Extraction Agents used in extraction processes of the present invention.

TABLE 1

EXTRACTION AGENTS (1) 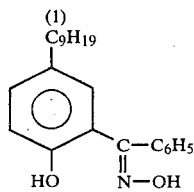

LIX 64 N (General Mills)

(8) 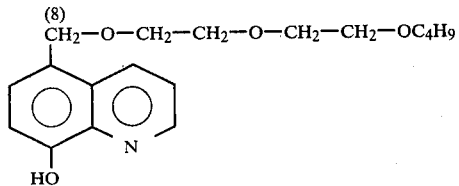

TABLE 1-continued
EXTRACTION AGENTS

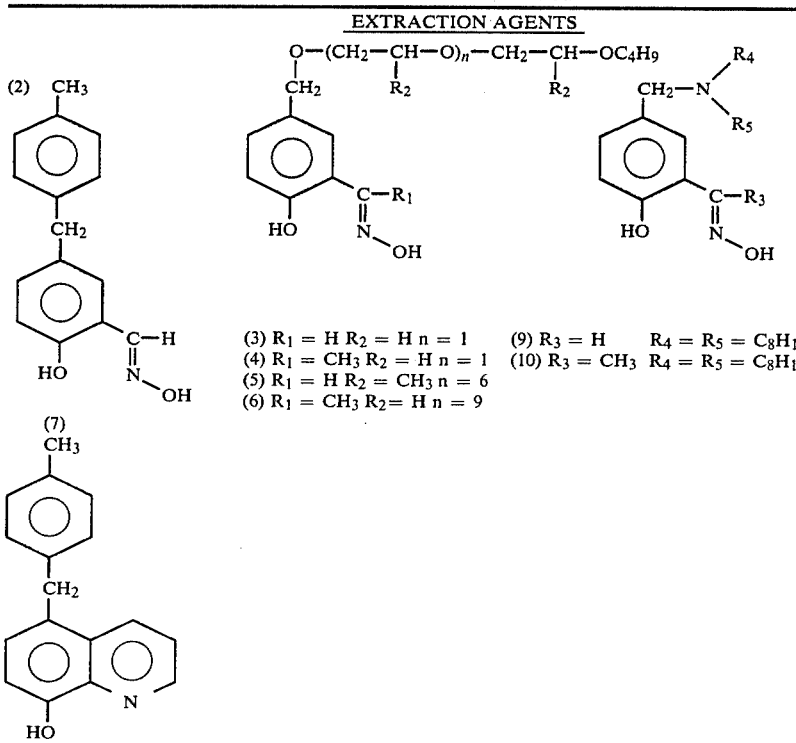

(3) $R_1 = H$  $R_2 = H$  $n = 1$     (9) $R_3 = H$  $R_4 = R_5 = C_8H_{18}$
(4) $R_1 = CH_3$  $R_2 = H$  $n = 1$     (10) $R_3 = CH_3$  $R_4 = R_5 = C_8H_{18}$
(5) $R_1 = H$  $R_2 = CH_3$  $n = 6$
(6) $R_1 = CH_3$  $R_2 = H$  $n = 9$

Di-(2-ethylhexyl)phosphoric acid (11)
Di-(hexyldioxyethylene)phosphoric acid (12)
Tributylphosphate (13)
Tri(hexyldioxyethylene)phosphate (14)
Di-(hexyldioxyethylene)-dioximinobenzil (15)
Di-butyl polypropylene glycol (MW 425); (16)

According to yet a further embodiment of the present invention, the hydrophobic backbone structure of the resin is modified. This can be advantageously effected by reacting a polymer so as to incorporate therein oxyalkylene units. For example, polymers having chloromethyl side-chains can be reacted with oxyalkylene sodium such as oxyethylene or oxypropylene sodium so as to obtain such modified hydrophilic resins. Similar oxyalkylene sodium compounds can be reacted so as to block the terminal groups with alkyl groups, and the resulting compounds can be used as additives to the impregnation mixture, resulting in improved characteristics of the extraction resins.

The invention thus provides for the production of improved impregnated resins which are effective and selective metal extraction agents and which can be used for the selective extraction of a desired metal from solutions thereof with other metals.

The following examples are to be construed in a non-limitative manner.

A. Preparations

EXAMPLE 1

Di-hexylpolyethylene glycol (600)

Sodium hydride suspended in paraffin oil (4 g) was washed several times with dry dioxane to remove the hydrocarbon and added to a solution of 150 g polyethylene glycol, M.W. 600, dissolved in 350 ml dry dioxane; cooled to 5° C. After dissolution, there were added 70 g of hexylbromide, and the mixture was refluxed for 20 hours. The excess of solvent was evaporated under vaccuo, and the residue, dissolved in chloroform, was washed with water, dried over a molecular sieve of 5 Å, and the excess of chloroform was removed.

EXAMPLE 2

Di-hexylpolypropylene glycol (425)

As in Example 1, but 105 g of polypropylene glycol M.W. 425 was used instead of the polyethylene glycol.

EXAMPLE 3

Compound 3, table 1

4-Chloromethylsalicylaldehyde (17 g=0.1 mole) was reacted with the sodium salt of diethyleneglycolmono-n-butyl (18.9 g=0.11 mole) in 200 ml diethylene glycol-mono-n-butyl ether at 100° C. for 24 hours. Excess of solvent was distilled off under vacuum and the residue was washed with water, to yield 32 g of the product. The ketone was reacted with 14 g (0.2 mole) of hydroxylamine hydrochloride in 100 ml methanol at 64° C. for 20 hours, then washed with water to yield 30 g of the oxime (4.0% N).

EXAMPLE 4

Compound 4, table 1

4-Chloromethyl-2-acetylphenol (19 g=0.1 mole) was reacted with the sodium salt of diethylene glycol mono-n-butyl ether (18.9 g=0.11 mole) in 200 ml diethyleneglycol-mono-n-butyl ether at 100° C. for 24 hours. Excess of solvent was distilled off under vacuum and the residue was washed with water to yield 34 g of a product, which was converted to oxime by reaction with 14 g (0.2 mole) NH$_4$OH HCl, in 100 ml methanol to yield: 33 g (3.2% N).

EXAMPLE 5

Compound 5, table 1

4-Chloromethylsalicylaldehyde (17.0 g=0.1 mole) was reacted with the sodium salt of polypropylene glycol of (molecular weight 400) mono-n-butyl ether (45.7 g=0.1 mole) in 100 ml dioxane at 100 ml for 20 hours. The product was dissolved in chloroform and the solution washed with water, then reacted with 14 g $NH_2OH \cdot HCl$ in 200 ml methanol to yield 60 g oxime, (2.3% N).

EXAMPLE 6

Compound 6, table 1

4-Chloromethyl-2-acetylphenol (19 g=0.1 mole) was reacted with 200 ml polyethylene glycol (M.W. −400) mono-n-butyl ether at 100° C. for 24 hours. The product was dissolved in 200 ml chloroform, and washed thoroughly with water. The ketone was converted to the oxime by reaction with 14 g $NH_2OH \cdot HCl$ in 100 ml methanol under reflux for 20 hours. The product was washed with water to yield the oxime (2.2% N).

EXAMPLE 7

Compound 8, table 1

5-Chloromethyl-8-hydroxyquinoline (23 g=0.1 mole) was reacted with the sodium salt of diethylene glycol mono-n-butyl ether (18.9 g=0.11 mole) in 200 ml diethyleneglycol mono-n-butyl ether at 100° C. for 20 hours, the excess of solvent was removed under vacuum and the residue dissolved in chloroform and washed several times with water to yield the oxime (3.2% N).

EXAMPLE 8

Tri(hexyldioxyethylene)phosphate

To a solution of 31.3 g (0.18 mole) of the sodium salt of diethyleneglycol monohexyl ether in 100 ml dry dioxane, there was added at 5°–10° C. at slow rate (2 hours) 5.15 g (10.05 mole) of phosphorous oxychloride ($POCl_3$) in 50 ml absolute dioxane. The mixture was left at room temperature for 20 hours, the excess of dioxan was distilled off under vacuum and the residue washed with water to yield 30.5 g of a product of 5.8% P.

EXAMPLE 9

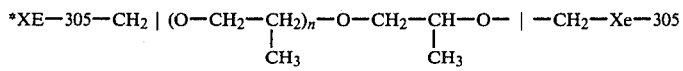

*The moieties to the left and to the right of the vertical lines designate the polymer backbone.

1.8 g of sodium was dissolved in 75 ml polypropylene glycol (PPG) (Amberlite M.W. 425) and 10 g of chloromethylated polystyrene (Xe-305 type manufactured by Rohm and Haas Co.) was added. The mixture was kept at 100° C. for 20 hours and treated as in Example 1, to yield 18.8 g of a product of 1.5% chlorine content, indicating 1.32 mmole of PPG units per gram of polymer

EXAMPLE 10

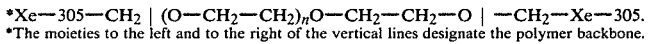

*The moieties to the left and to the right of the vertical lines designate the polymer backbone.

*The moieties to the left and to the right of the vertical lines designate the polymer backbone.

Sodium hydride suspended in paraffin oil (4 g) was washed several times with dry dioxane to remove the hydrocarbon, and then added to a solution of 150 g polyethyleneglycol M.W. 600 dissolved in 350 ml dry dioxane, cooled to 5° C. After completion of the dissolution, there were added 21 g of chloromethyl polystyrene swollen in 75 ml dry dioxane and rinsed with 75 ml more dry dioxane. The mixture was kept at 90°–100° C. for 24 hours, then cooled and solvent removed by filtration. The polymer was washed with 1:1 MeOH/water, then MeOH and ether. Yield: 43 g.

B. Impregnation Methods

Three impregnation methods are applied.
(1) dry impregnation method
(2) wet impregnation method
(3 metal-complex impregnation method

(1) Dry Impregnation method

The polymer is equilibrated with the solution, and then the excess diluent is removed by evaporation under reduced pressure (1–100 torr) or at elevated temperatures (30°–90° C.). This method is suitable only for hydrophilic reagents, such as those containing the oxyethylene chain (Table 1, compounds 3, 4, 5,6, 8, 9, 10, 12, 14, 15, 16). If hydrophobic reagents are to be impregnated by the dry method, a modifier, such as di-butylpolypropylene glycol (compound 16) is to be added to the impregnation mixture.

(2) Wet impregnation method

The impregnation mixture is allowed to stand until the external diluent is removed, then a metal salt is added, and the metal-ligand complex is formed in situ i.e., inside the polymer beads, in the presence of residual amount of solvent. The metal is then eluted under suitable conditions, and the resin is then ready to be used. This method is generally applicable. The following conditions are used for metal complexation and elution during the "conditioning" of the polymer.

| Metal | Stock Solutions For Complexation | Eluting Solutions |
| --- | --- | --- |
| Copper | 3 gpl $CuSO_4$ pH 4.0 | 1N $H_2SO_4$ |
| Uranium | 3 gpl $UO_2$ pH 2.0 | 3N $H_2SO_4$ |
| Zinc | 3 gpl $ZnSO_4$ pH 5.0 | 3N $H_2SO_4$ |
| Nickel | 3 gpl $NiSO_4$ pH 4.0 | 3N $H_2SO_4$ |

(3) Metal-complex impregnation method

The ligand is dissolved in chloroform, and this solution is used to extract the metal from aqueous stock solutions as described in the previous method. Now, the metal-complex containing solution is equilibrated with the polymer, and then excess diluent is removed by evaporation under reduced pressure. The following examples are to illustrate the various impregnation methods:

EXAMPLE 11 (WET METHOD)

10 g copper extractant LIX 64N (General Mills) was dissolved in dichloromethane. To this mixture 20 g dry Amberlite XAD-2 polymeric adsorbant (Rohm & Haas) was added. The polymer was allowed to soak in the solution enough time so that the whole solution volume was swallowed by the polymer. 300 ml of 3 gpl $Cu^{II}$ of pH 4.0 was added. Finally the polymer was washed in a soxhlet apparatus with hot water (30°–50° C.), the metal is then eluted with 100 ml of 1 N $H_2SO_4$.

Product: 30 g.

EXAMPLE 12 (DRY METHOD)

10 g of copper extractant Lix-64N (General Mills) was dissolved in 50 ml dichloromethane containing 5 g of Compound 14, Table 1. To this mixture 20 g dry Amberlite XAD-2 polymeric adsorbant (Rohm & Haas) was added. The polymer was allowed to soak in the solution for 1 hour so that the whole solution was swallowed by the polymer. Hot air was passed to remove excess solvent, and finally the polymer was dried in an oven at 50°–70° under vacuum until free-flowing beads were obtained.

Yield: 35 g.

EXAMPLE 13 (DRY METHOD)

10 g copper extractant (Compound 3, Table 1) was dissolved in 50 ml dichloromethane. To this mixture 20 g dry polyether as described in Example 10, which was preheated in an oven, kept at 30°–50° C. was added. The polymer was allowed to soak in the solution enough time so that the whole solution volume was swallowed by the polymer. Hot air was passed to remove excess solvent, and finally the polymer was dried in the oven at 50°–70° C. under vacuum until free flowing beads were obtained.

Yield: 30 g.

EXAMPLE 14 (DRY METHOD)

10 g copper extractant, compound 2, Table 1, was dissolved in 50 ml dichloromethane, containing 5 g, Compound 16, Table 1. To this mixture 20 g dry Amberlite XAD-2 polymeric adsorbant (Rohm & Haas) which was preheated in an oven, at at 30°–50° C. was added. The polymer was allowed to soak in the solution enough time so that the whole solution volume was swallowed by the polymer. Hot air was passed to remove excess solvent, and finally the polymer was dried in the oven at 50°–70° C. under vacuum until free-flowing beads were obtained.

EXAMPLE 15 (DRY METHOD)

10 g copper extractant Lix-64N (General Mills) was dissolved in 50 ml dichloromethane, containing 5 g of dibutylpolypropylene glycol (M. W. 53.7). To this mixture dry Amberlite XAD-2 polymeric adsorbant (Rohm & Haas) (20 g) which was preheated in an oven, kept at 30°–50° C. was added. The polymer was allowed to soak in the solution enough time so that the whole solution volume was swallowed by the polymer. Hot air was passed to remove excess solvent, and finally the polymer was dried in the oven at 50°–70° C. under vacuum until free-flowing beads were obtained.

Yield: 35 g.

EXAMPLE 16 (WET METHOD)

10 g uranium extractant Alamine 336 (General Mills) was dissolved in 50 ml dichloromethane. To this mixture 20 g dry Ambelite XAD-2 polymeric adsorbant (Rohm & Haas) was added. The polymer was allowed to soak in the solution enough time so that the whole solution volume was swallowed by the polymer. 300 ml of 3 gpl $UO_2^{++}$ pH 2.0 was added and finally the polymer was extracted by hot water (30°–60° C.) in a soxhlet apparatus. Sample designated as F, and the metal eluted with 100 ml 3 N $H_2SO_4$.

Product: 30 g.

EXAMPLE 17 (WET METHOD)

The cationic extractant 2-diethylhexyl phosphoric acid (10 g) was dissolved in dichloromethane (50 ml); to this mixture dry Amberlite XAD-2 polymeric adsorbant (Rohm & Haas) (20 g) was added. The polymer was allowed to soak in the solution until the whole solution was taken up by the polymer. 300 ml of 3 g/l $Zn^{II}$ pH 4.0 were added, and the complex washed with hot water (30°–60°) in a soxhlet apparatus, and the metal eluted with 100 ml 3 N $H_2SO_4$.

EXAMPLE 18 (METAL-COMPLEX METHOD)

10 g of the copper extractant (Compound 2, Table 1) are dissolved in 100 ml chloroform. This solution was mixed with 100 ml aqueous solution containing 10 gpl copper sulfate at pH 2.0. The organic phase was separated, and 20 gr of dry Amberlite XAD-2 was added. After 2 hours standing the excess chloroform was removed by evaporation at 50°–70° C. under reduced pressure. (25 torr).

C. Applications in Extraction Processes

The advantageous properties of the novel reagents are demonstrated with reference to the extraction of metals. All columns were rinsed with 2 N $H_2SO_4$ to remove copper and washed with water to a pH of 7.0.

EXAMPLE 19 EXTRACTION OF COPPER

In the experiments a 3.0 gpl $Cu^{II}$ (as $CuSO_4$) solution of pH 4.0 was passed through columns containing 20 g of polymer. The polymers used contained 1 mmole of oxime groups per gram XAD-2. The loading capacity was determined by analysis of the barren solution and agreed well with results obtained from elution of the column with 1 N $H_2SO_4$.

The results are:

Table 2

| | | (mg) Cu adsorbed per 20g polymer (modifer = Comp 14) | | |
|---|---|---|---|---|
| No. | Reagent | Polymer | Dry Method | Wet Method | Dry Method + 15% Modifier |
| A | Lix-64N | XAD-2 | 50 | 475 | 492 |
| B | 2 | XAD-2 | 98.7 | 560.8 | 603 |
| C | 3 | XAD-2 | 540 | 530 | — |
| D | Lix-64N | Polyether | 450 | 430 | — |

The results show the advantage of using the modifiers (blocked polyoxyethylenes or polyoxypropylene), and the advantage of the wet method for hydrophobic reagents like Lix-64N and Reagent No. 2. It is evident that polyether oximes (Comp. 3–6) represented by Comp. No. 3 (Example 19/C) can be impregnated by any method and do not require a modifier. It is also shown (Example 19/D) that Lix-64N may be impregnated successfully on polymeric polyethers (described in Examples 9, 10).

EXAMPLE 20 (COPPER BASE METAL SEPARATIONS)

The following SIR* reagents containing 1 mmole reagent per gram polymer preferred by the wet method were tested.

Lix-64N on XAD-2
Lix-64N on XAD-4
Lix-64N on polyether (Example 10)
Reagent 2 on XAD-2
Reagent 2 on XAD-4
Reagent 2 on polyether (Example 10)
Reagent 3 on XAD-2
Reagent 3 on XAD-4
Reagent 3 on polyether (Example 10)

*Solvent Impregnated Resin

In a typical experiment 20 g of SIR polymer were packed in a column, and a copper/iron solution of pH 2.0 was passed at a rate of 0.5 ml/min. After full loading of resin a solution of sulphuric acid of pH 4.0 was passed through, and the metal eluted with 1 N $H_2SO_4$ The selectivity factor is calculated by the ratio Cu/Fe picked up by the resin.

The results of a typical experiment (1 M Reagent 3 on XAD-2) is given in the next Table. Similar results were obtained with all SIR resins for copper.

Table 3

| $Cu^{II}$ Concentration (gpl) at pH 2.0 | Cu/Fe Molar Ratio | Selectivity | | |
|---|---|---|---|---|
| | | Cu/Ni | Cu/Fe | Cu/Zn |
| 1.5 | 1:1 | >500 | 93 | >500 |
| 3.0 | 1:1 | >500 | 452 | >500 |
| 15.0 | 10:1 | >500 | 150 | >500 |

The above results show very favorable selectivities over the range of practical concentrations and Fe/Cu ratios.

EXAMPLE 21—ELUTION

Quantitative and fast elution is necessary to ensure a repeated use of the polymer. Quite surprisingly, the elution from the polymers was even faster then the adsorbtion and was achieved with 1 N sulphuric acid. In comparison the stripping of Lix-64N in kerosene is obtained only with 2-3 N $H_2SO_4$. The elution efficiency of 1 M reagent on XAD-2 is shown below.

Table 4

| Reagent | Method | mg Cu Adsorbed | Mg Cu Eluted |
|---|---|---|---|
| Lix-64N | Modifier | 200 | 197 |
| 2 | Wet | 540 | 537 |
| 3 | Dry | 330 | 325 |

Similar results were obtained with other SIR resins.

EXAMPLE 22—KINETICS

In all the experiments 2 g of polymers containing 1 m mole of reagent per gram (prepared by the Wet Method) resin were contacted with 20 ml of a 2.0 gpl $Cu^{II}$ (as $CuSO_4$) of pH 4.0, and aliquats were withdrawn at certain times and analyzed for their copper content. The half lifetime ($\frac{1}{2}$) for adsorbtion and elution are given below.

| Reagent | Polymer | 15% Modifier | $T_{\frac{1}{2}(min)}$ Adsorbtion | Elution |
|---|---|---|---|---|
| 2 | XAD-2 | — | 5 | 1.5 |
| 2 | XAD-4 | — | 8 | 2 |
| 2 | Xe-305-PEG-600 (Ex. 10) | — | 4 | 2 |
| 2 | XAD-4 | + | 3 | 4 |
| 3 | XAD-4 | — | 5 | 2 |
| 3 | Xe305-PEG-600 (Ex. 10) | — | 5 | 1 |
| 4 | XAD-2 | — | 4 | 4 |
| 4 | XAD-4 | — | 3 | 3 |
| Lix-64N | XAD-4 | + | 8 | 4 |
| Lix-64N | Xe-305-PEG-600 (Ex. 10) | — | 2 | 4 |

The experiments indicate that for all SIR resins elution is faster than adsorbtion and that the efficiency order for the reagents is:

Comp 4>comp 3>comp 2>Lix64N

The polymers can be rated according to the ease of metal uptake or release as follows:

Xe-305-PEG-600(Ex. 10)>XAD-2>XAD-4

The kinetic behavior of the resins shows their improved properties over any other copper resins, including general purpose cation exchangers.

EXAMPLE 23—EXTRACTION FROM DILUTE SOLUTIONS

The fast kinetics of the resins ensured quantitative pickup of metal values even from very dilute solutions. In an experiment 3 liter of 10 ppm Cu as $CuSO_4$, pH 4.0 were passed through 20 g of 1 M reagent 3 XAD-2, and the metal eluted by 1 N $H_2SO_4$.

Yield: 33 g/mg Cu, accounting for 110% recovery.

In a second experiment 30 liters of 1 ppm Cu of pH 4.0 were passed. Again recovery was quantitative.

EXAMPLE 24—EXTRACTION OF ZINC

Polymers containing 1 mmole 2-diethylhexyl phosphoric acid per gram were prepared and tested in columns. 20 ppm zinc (as $ZnSO_4$) solutions containing 30 gpl $CuSO_4$ were passed through. The zinc in the raffinate was analyzed by atomic adsorption spectroscopy.

Table 5

| Reagent | Polymer | (15%) Modifier | Method | Zn in Effluent (ppm) | Metal mg per gram Polymer Zn | Co |
|---|---|---|---|---|---|---|
| 2-EHPA | XAD-2 | — | dry | 20 | 0 | 0 |
| 2-EHPA | XAD-2 | — | wet | <1 | 6 | 2 |
| 2-EHPA | XAD-2 | + | dry | <1 | 6 | 2 |
| 2-EHPA | Xe-305-PEG-600 (Ex. 10) | — | dry | <1 | 6 | 2 |
| 10 | XAD-2 | — | dry | <1 | 10 | 3 |
| 10 | Xe-305-PEG-600 (Ex. 10) | — | dry | <1 | 9 | 3 |

To summarize:

The improvements shown promise that whenever a hydrophobic reagent is to be immobilized in a polymeric matrix, it can be achieved in three ways: (1) wet impregnation method; (2) addition of a modifier immiscible in the polymeric phase and immiscible in water, such as terminally blocked polypropylene glycol; (3)

impregnation on a polymer that has good wetting properties, such as polystyrene-polyether combination.

D. Polymeric materials containing dispersed metals and catalysts

The impregnation methods described in part B enable the transfer of metal complexes of various sequestering agents from an organic liquid phase into a polymeric phase. Besides the ligands and metals described in part B, numerous extraction reagents may be applied. They are described in "Ion Exchange and Solvent Extraction of Metal Complexes" by Y. Marcus and A. S. Kertes, Wiley-Interscience, 1969. For example: long chain carboxylic acids, or sulphonic acids, high molecular weight amines of all kinds, mono, di, and tri alkylesters of phosphoric acid and thio phosphoric acid.

The metal complexes of the aforementioned reagents are introduced into a suitable polymeric carrier such as polystyrene or substituted polystyrene of high surface area as described in part B, sections 1-3. Then the metal is either precipitated as the hydroxide by simply contacting the polymer with an alkaline pH solution or it is reduced to metal by any form of active hydrogen* such as $H_2$, hydrazine, sodium borohydride, aluminum hydrides, diborane, or by trialkyl derivatives of metals, such as trialkyl aluminum. After this, the liquid reagent is released during the hydrolysis or the reduction procedure and regenerated from the polymer by washing it off with a suitable solvent, such as $CH_3OH—CHCl_3$ mixture, methylisobutylketone, or other combinations.

* See for example: A. R. Burkin and F. D. Richardson, Powder Metal, 10, 33 (1967).

The following examples describe the preparation of such polymeric powders or catalysts.

EXAMPLE 25

Polymers Containing Dispersed Platinum 25 ml of 0.025 M platinic acid ($H_2PtCl_6$) were extracted by 25 ml of 0.2 M trioctylamine in chloroform. To this solution 12.5 g of Amberlite XAD-2 was added and the solution left to stand for 1 hour while the whole of the solvent was taken up by the polymer. Then 10 ml of 50% hydrazine in water were added to the polymer, and this mixture was left at 50°-80° C. for 1 hour. The black polymer was filtered off, washed with water to neutral pH and then with $CH_3OH$, $CHCl_3:CH_3OH$ (1:1), and finally with $CHCl_3$, to produce a polymer containing 0.05 mmole Pt per gram polymer.

EXAMPLE 26

Polymer Containing Dispersed Palladium

It was prepared in a similar manner to Example 25 from 25 ml of 0.025 M $H_2PdCl_4$ and 25 ml of 0.2 M trioctylamine. It contained 0.05 mmole Pd per gram polymer.

EXAMPLE 27

Polymers Containing Dispersed Rhodium and Iridium $H_2IrCl_6$ or $H_2RhCl_6$ can be extracted into trioctylamine described in Example 25 and 26 alternatively. The thiocyanato complexes are prepared with sodium thiocyanato at pH 2 and then extracted into methyl-isobutylketone. The organic layer, 25 ml of 0.025 M Ir or Rh is added to 12 g of XAD-4 and left to stand until the whole solvent is taken up by the polymer, followed by 10 ml of $N_2H_4$. After the reduction at 80°-120° C., the polymer is filtered off and excess $N_2H_4$ removed by water. The MIBK is removed by methanol.

EXAMPLE 28

Polymers Containing Dispersed Copper, Zinc and Iron Polymers

These three metals from anionic complexes at chloride concentration range of 2 N-10 N and can be extracted by quaternary ammonium salts. For example, 25 ml of 0.1 N copper chloride, zinc chloride or ferric chloride in 6 N hydrochloric acid were extracted in 25 ml of 0.2 M Aliquat 336, a commercial quaternary ammonium compound in chloroform. Then 11.5 g of XAD-2 was added and the whole solvent was taken up by the polymers then 10 ml of 50% $N_2H_4$ was added and mixture heated to 120° C. for 2 hours. The polymers were washed with water, $CH_3OH$, $CHCl_3:CH_3OH$ (1:1).

EXAMPLE 29

Heavy Ion Exchangers

Ion exchange resins both of the cationic or anionic type are impregnated and the reduction procedure is followed up with any metal salt. The net result is an increase in the true density of the ion exchanges, according to the relative amounts of resin and metal salts.

I claim:

1. A process for the production of an impregnated resin metal ion extraction agent, comprising:
   impregnating a macroporous, hydrophobic polystyrene polymer or copolymer with a hydrophobic, metal ion specific extractant in the presence of a diluent for the extractant;
   removing any diluent which is not adsorbed by the polymer or copolymer;
   contacting the product with a solution containing a metal ion for which said extractant is specific to form an extractant-metal ion complex; and
   eluting the metal from the extractant-metal ion complex with a suitable eluant.

2. A process in accordance with claim 1, wherein said eluant comprises sulfuric acid.

3. A process in accordance with claim 1 wherein said diluent is selected from the group consisting of methylene chloride, benzene, pentane, hexane, carbon disulfide, chloroform, carbon tetrachloride, and dichloroethane.

4. The impregnated resin produced by the process of claim 1.

5. An impregnated resin in accordance with claim 4 wherein said extractant is selected from the group consisting of:

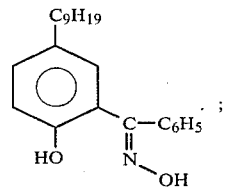

-continued

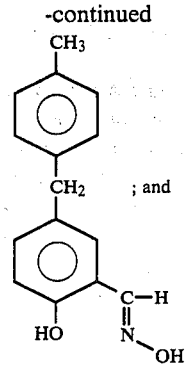; and

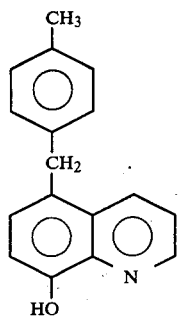

6. A process in accordance with claim 1 wherein said extractant is selected from the group consisting of:

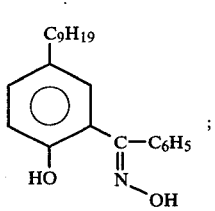;

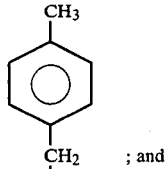; and

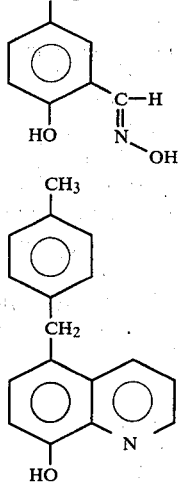

7. A process for the production of an impregnated resin metal ion extraction agent, comprising:

forming a complex of a metal ion specific extractant and a metal ion for which said extractant is specific in the present of a diluent for the extractant;

impregnating a macroporous, hydrophobic polystyrene polymer or copolymer with said diluent containing said complex;

removing any diluent which is not adsorbed in the polymer or copolymer; and eluting the metal from the extractant-metal ion complex with a suitable eluant.

8. A process in accordance with claim 7 wherein said extractant is selected from the group consisting of:

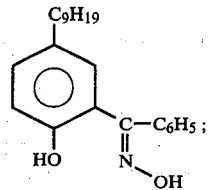

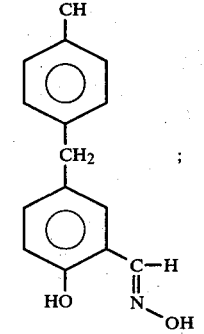

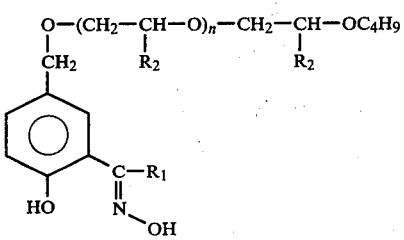

wherein $R_1 = H$ or $CH_3$, $R_2 = H$ or $CH_3$ and $n = 1-9$;

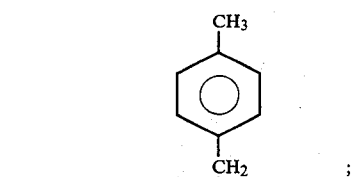

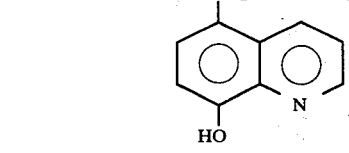

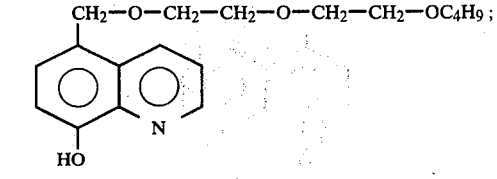

-continued

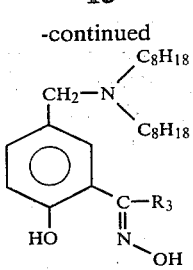

wherein $R_3 = H$ or $CH_3$;
di-(2-ethylhexyl) phosphoric acid;
di-(hexyldioxyethylene) phosphoric acid;
tributylphosphate; and
tri-(hexyldioxyethylene) phosphate.

9. A process in accordance with claim 7 wherein said eluant comprises sulfuric acid.

10. A process in accordance with claim 7 wherein said diluent is selected from the group consisting of methylene chloride, benzene, pentane, hexane, carbon disulfide, chloroform, carbon tetrachloride, and dichloroethane.

11. An impregnated resin metal ion extraction agent comprising a macroporous polymer or copolymer of polystyrene having a polymeric backbone rendered hydrophilic by incorporation therein of oxyalkylene units, and a metal ion specific extractant supported thereby.

12. An impregnated resin metal ion extraction agent in accordance with claim 11 wherein said extractant is selected from the group consisting of:

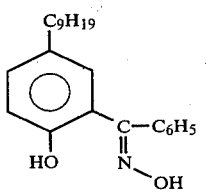

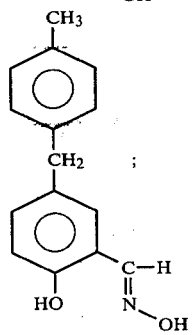

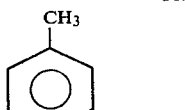

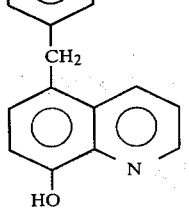

di-(2-ethylhexyl) phosphoric acid; and tributylphosphate.

13. An impregnated resin metal ion extraction agent comprising a macroporous polymer or copolymer of polystyrene, and a metal ion specific extractant supported thereby wherein the molecules of said extractant have been modified by the incorporation therein of oxyalkylene units or amine side chains.

14. An extraction agent in accordance with claim 13 wherein said extractant is selected from the group consisting of:

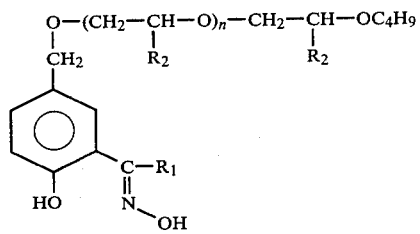

wherein $R_1 = H$ or $CH_3$, $R_2 = H$ or $CH_3$ and $n = 1-9$;

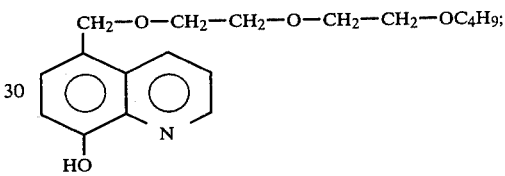

$CH_2-O-CH_2-CH_2-O-CH_2-CH_2-OC_4H_9$;

wherein $R_3 = H$ or $CH_3$;
di-(hexyldioxyethylene)phosphoric acid;
tri-(hexyldioxyethylene) phosphate; and
di-(hexyldioxyethylene)dioximinobenzil.

15. A process for the production of an impregnated resin metal ion extraction agent, comprising:
impregnating a macroporous hydrophobic polystyrene polymer or copolymer with a solution containing a hydrophobic metal ion specific extractant and a dialkyl-polyalkylene glycol in a suitable diluent adsorbable by said polymer or copolymer; and
removing excess diluent.

16. A process in accordance with claim 15 wherein said extractant is selected from the group consisting of:

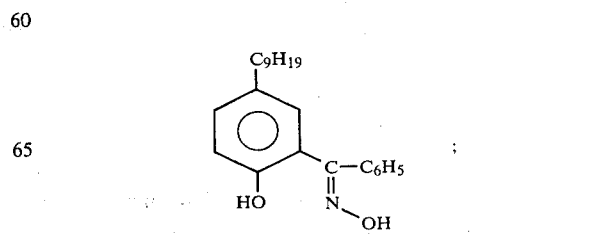

-continued
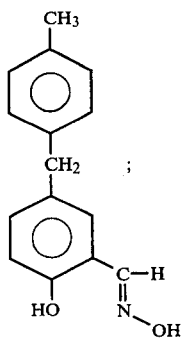
-continued
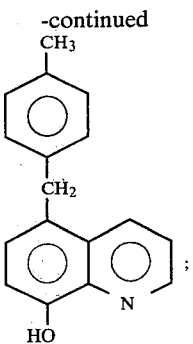
di-(2-ethylhexyl) phosphoric acid; and tributylphosphate.
17. The impregnated resin produced by the process of claim 15.
* * * * *